US006876950B2

(12) United States Patent
Beney et al.

(10) Patent No.: US 6,876,950 B2
(45) Date of Patent: Apr. 5, 2005

(54) SYSTEM AND METHOD FOR DAMAGE EVALUATION

(75) Inventors: Thomas C. Beney, Florissant, MO (US); Christopher L. Morris, Glendale, MO (US); Terry D. Richardson, Florissant, MO (US); Alex Rubin, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 326 days.

(21) Appl. No.: 10/133,869

(22) Filed: Apr. 26, 2002

(65) Prior Publication Data

US 2003/0204332 A1 Oct. 30, 2003

(51) Int. Cl.[7] .................................................. G06F 3/06

(52) U.S. Cl. ....................... 702/183; 702/152; 702/156; 702/182

(58) Field of Search ............................ 702/94, 95, 150, 702/152, 153, 156, 167, 182, 183, 186, 188; 280/781; 414/563; 705/1; 711/144; 701/50; 370/352; 340/568.1

(56) References Cited

U.S. PATENT DOCUMENTS

| | | | | |
|---|---|---|---|---|
| 5,341,575 A | * | 8/1994 | Chisum | 33/608 |
| 5,377,098 A | * | 12/1994 | Sakai | 705/29 |
| 6,421,593 B1 | * | 7/2002 | Kempen et al. | 701/48 |
| 2004/0024502 A1 | * | 2/2004 | Squires et al. | 701/33 |

* cited by examiner

*Primary Examiner*—Marc S. Hoff
*Assistant Examiner*—Felix Suarez
(74) *Attorney, Agent, or Firm*—Harness Dickey & Pierce P.L.C.

(57) ABSTRACT

A system for utilizing a computer to analyze damage to a structure. The system includes a damage disposition program for determining an appropriate repair procedure for repairing the damage to the structure. Additionally, the system includes a processor for executing the damage disposition program. A predefined set of damage class determination rules are utilized by the damage disposition program to determine a damage class.

28 Claims, 14 Drawing Sheets

SYSTEM AND METHOD FOR DAMAGE EVALUATION

COPYRIGHT NOTICE

A portion of the disclosure of this document contains material that is subject to copyright protection. The copyright owner has no objection to the facsimile reproduction by anyone of the patent disclosure, as it appears in the U.S. Patent and Trademark Office patent files or records, but otherwise the copyright owner reserves all copyright rights whatsoever.

FIELD OF INVENTION

The invention relates generally to dispositioning damage to a structure, such as an aircraft. More specifically, the invention relates to a system that displays data input fields, accepts user inputs in the data fields, analyzes the user inputs and determines an appropriate repair procedure based on the user inputs.

BACKGROUND OF THE INVENTION

Repairing damage to a structure requires detailed analysis of the damage. Depending on the specific structure part that is damaged, analysis can be a simple procedure or a very complex procedure. In reference to an aircraft, known systems and methods for analyzing and determining a necessary repair, referred to as dispositioning, require a complex set of steps that a maintainer has to perform, which require a great deal of labor and time.

For example, when an aircraft has been damaged the maintainer follows a set of written procedures from various Integrated Electronic Technical Manuals (IETMs) or paper manuals. The typical procedure set forth in the IETMs requires the maintainer to make one or more Mylar™ templates of a part and subdivide the form into grids of various predetermined sections or zones. Different templates show different aspects of the damage. For example one template will show allowable damage depth and another will show the allowable diameter of the damage. The maintainer then applies the form to the damaged part to determine the actual location of the damage within the grid. Based on the location of the damage the maintainer refers to an IETM that has multiple procedures for performing various tasks on the aircraft, and follows the procedures set out in the IETM, which may require collecting more data. During this process the maintainer may have to reference several IETMs and take several sets of data as directed by each reference to each IETM. Once the maintainer has recorded all the data, the maintainer utilizes the IETMs to determine the severity or class of the damage and whether the damage is repairable. The maintainer then calculates whether the damage is reparable and if the damage is repairable, the maintainer again utilizes the IETMs to determine the proper repair configuration, materials and processes needed to make the repairs. This process is labor intensive and costly.

It would be desirable to have an automated system for analyzing damage to a structure, such as an aircraft, train, bus, tank or ship. Such a system would present a maintainer with data fields in which requested data pertaining to the damage would be entered, apply the data to a predetermined set of rules stored in a database, and determine an appropriate repair procedure based on an interpretation of the data. As used herein, the word 'structure' is defined as a complete structure comprising various parts. For example, an aircraft is a structure comprising a fuselage, wings, a stabilator, etc. Thus, analysis of damage to a structure involves analysis of damage to specific parts of the structure.

BRIEF SUMMARY OF THE INVENTION

In a preferred embodiment, a system is provided for analyzing damage to a structure. The system includes a damage disposition software package for determining an appropriate repair procedure for repairing the damage to the structure. Additionally, the system includes a processor for executing the damage disposition software package, and a predefined set of damage class determination rules utilized by the damage disposition software package to determine a damage class.

In another preferred embodiment, a method is provided for analyzing damage to a structure utilizing a system including a processor, a processor-user interface, a database, a damage disposition software package, and a predefined set of damage class determination rules. The method includes executing the damage disposition software package utilizing the processor, inputting data in a plurality of interactive panels generated by the damage disposition software package and displayed on the processor-user interface, and determining an appropriate repair procedure for repairing the damage to the structure utilizing the damage disposition software package and the input data.

In yet another preferred embodiment, a computer-readable medium is provided having encoded thereon instructions interpretable by a computer to instruct the computer to display a plurality of interactive panels on a processor-user interface, wherein at least one of the interactive panels includes at least one data entry field. Additionally, the encoded instructions instruct the computer to receive input data entered in the data entry field using the processor-user interface, apply a set of damage class determination rules to the input data to determine a damage class, and determine an appropriate repair procedure based on the input data, the damage class and previous repair data. The appropriate repair procedure designates a specific set of steps used for repairing damage to a structure.

BRIEF DESCRIPTION OF THE DRAWINGS

The present invention will become more fully understood from the detailed description and accompanying drawings, wherein.

DETAILED DESCRIPTION OF THE INVENTION

The following description of the preferred embodiments is merely exemplary in nature and is in no way intended to limit the invention, its application or uses. As described below, the present invention is directed to a system and method for dispositioning damage to a structure. As used herein, dispositioning means the analysis of damage to a structure and the determination of an appropriate repair procedure required to repair the damage. Although the preferred embodiments are described in reference to aircraft, the invention should not be so limited in application. It is envisioned that the invention is applicable to aircraft, trains, buses, tanks, ships, buildings, or any other structure that may incur damage and require repair.

Figure 1:
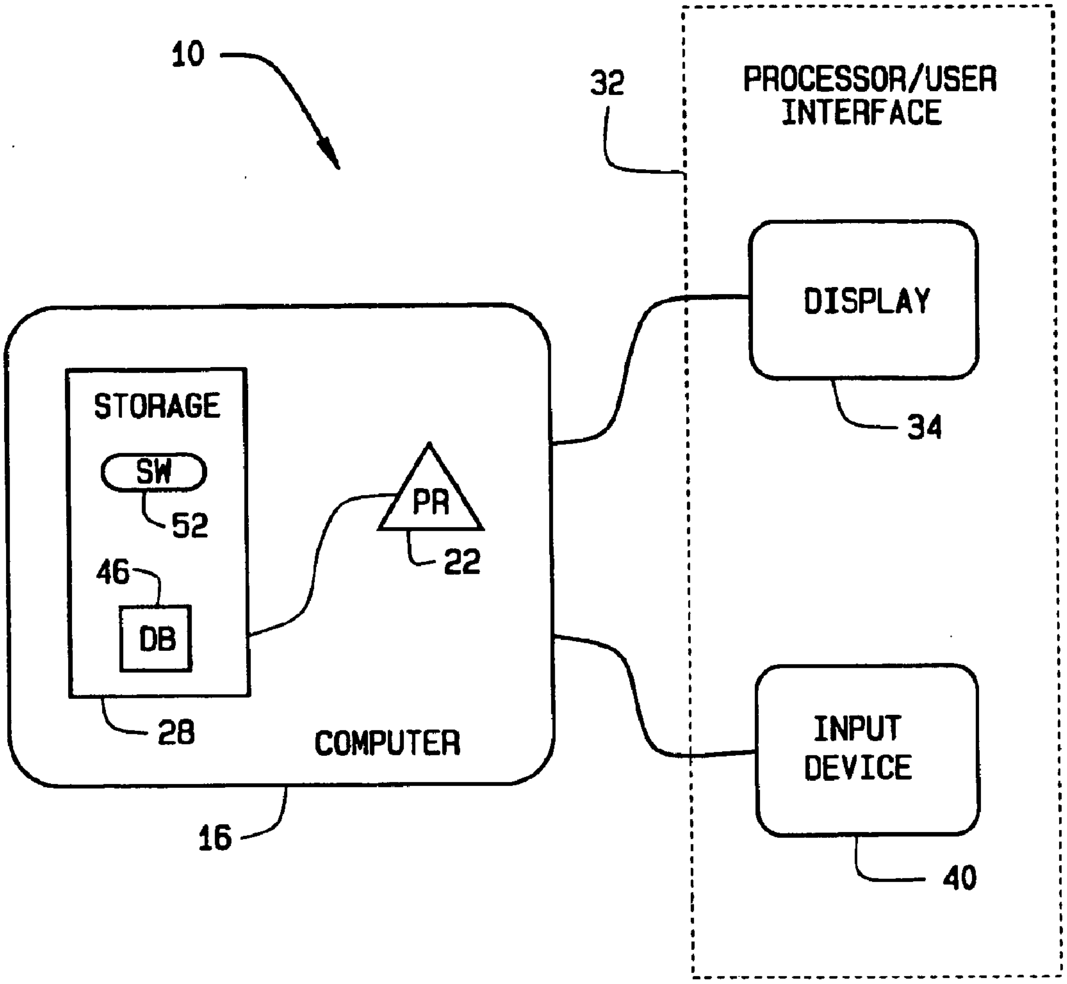
FIG. 1 is a schematic of a system for dispositioning damage to a structure, in accordance with a preferred embodiment of the present invention.

FIG. 1 is a schematic of a system 10 for dispositioning damage to a structure, such as an aircraft, in accordance with a preferred embodiment of the present invention. System 10 includes a computer 16 that includes a processor 22 suitable to execute all functions of computer 16, and an electronic storage device 28. Storage device 28 is a computer readable medium, such as a hard drive, for storing such things as software packages or programs, algorithms, information and data. Additionally, system 10 includes a processor-user interface 32. Processor-user interface 32 is connected to computer 16 and includes a display 34 for viewing such things as information, data, and graphical representations, and a data input device 40 that allows a user to input information, data, and queries to computer 16. For example, data input device 40 can be a keyboard or a mouse. In a preferred embodiment, computer 16 is a laptop computer wherein processor-user interface 32 is included in computer 16 such that display 34 is hingedly connected to computer 16 and input device 40 integrally formed with computer 16. Alternatively, computer 16 can be any suitable computer capable of storing data and executing software programs.

Furthermore, system 10 includes a database 46 for storing information and data specific to the structure that is to have damage dispositioned, and to repair procedures for repairing the damage. For example, database 46 may store algorithms, a predefined set of rules, reference tables specific to the dispositioning of damage to an aircraft, and electronic repair procedures. In a preferred embodiment, database 46 is included in storage device 28. In an alternate embodiment, computer 16 includes database 46 separate from storage device 28. In another alternate embodiment, database 46 is separate from and connected to computer 16.

System 10 further includes a damage disposition software package, or program, 52 stored on storage device 28 and executed by processor 22 using inputs from input device 40. Execution of software package 52 creates a series of interactive screens or panels that are graphically displayed on display 34. The panels display such things as data requests and graphical representations of the structure to be repaired and the location of the damage on the structure. A user, or maintainer, such as an engineer or maintenance person, views the panels and inputs the requested data. The software package, via processor 22, interprets the data, stores the data if necessary on storage device 28 or in database 46, and presents an appropriate subsequent panel based on the data input in previous panels.

In a preferred embodiment, system 10 is a subsystem of larger system (not shown), such as a network or LAN. System 10 is removably connected to the network, which includes a server on which a comprehensive damage repair program, such as an IETMs software program, is stored and executed. Thus, system 10 can be disconnected from the network, taken to a remote site, utilized to execute damage disposition software package 52 and collect data, and then reconnected to the network where the collected data is downloaded to the network server or other subsystems connected to the network, e.g. a computer connected to the network. When connected to the network, system 10 can also receive data uploaded from a network server or other subsystems connected to the network.

For example, the network server executes the comprehensive damage repair program, e.g. the IETMs software program, which advances through a series of steps. One of the steps is to disposition the damage to the structure. At this point, any necessary data is uploaded to system 10. System 10 is then removed from the network, taken to the site of the damaged structure, where the maintainer utilizes system 10 to execute damage disposition software package 52. System 10 is then reconnected to the network and the data collected during execution of disposition software 52 is downloaded to the network server, and the comprehensive damage repair program utilizes the downloaded data to complete execution of the damage repair.

In another preferred embodiment, system 10 is a standalone system used to execute a comprehensive damage repair program, such as the IETMs software program, stored in database 46. The comprehensive damage repair program includes a damage disposition sub-routine such as damage disposition software 52, that is executed during a specific phase of the comprehensive damage repair program.

Although the description of the present invention is described below in terms of damage disposition software package 52 having a direct effect on, and direct control of, system 10, is should be understood that it is the instructions generated by the execution of damage disposition software package 52 by processor 22, and the subsequent implementation of such instructions by processor 22 that have direct effect, on and direct control of, system 10.

Figure 2:
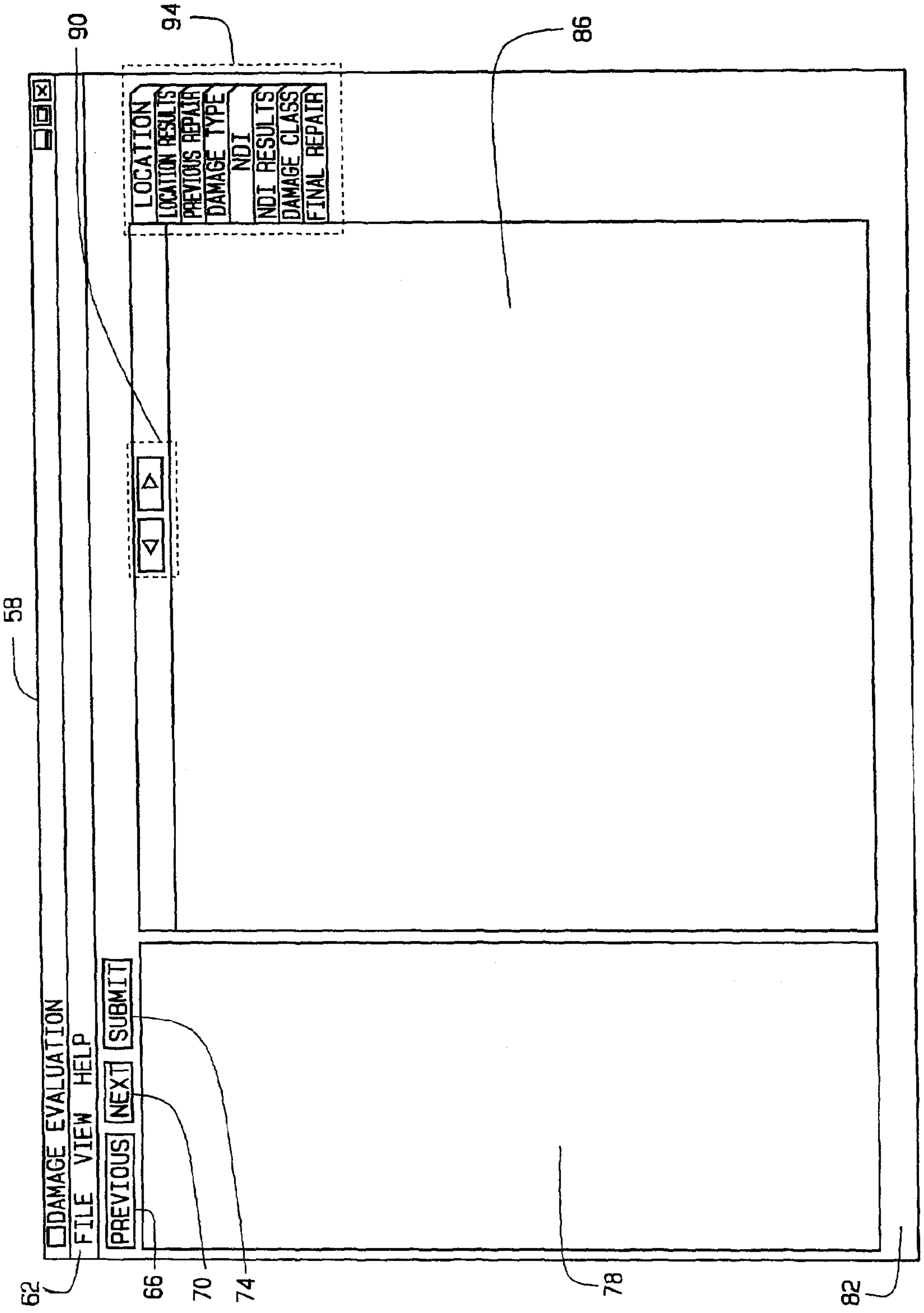
FIG. 2 is an illustration of an overall panel layout of a series of panels created by a disposition software package executed by the system shown in FIG. 1.

FIG. 2 is an illustration of an overall panel layout 58 of the series of interactive panels created by software package 52 and displayed on display 34. Panel layout 58 includes a pull down menu bar 62 that includes such menus as a File, View, and Help menu. Additionally, panel layout 58 includes a Previous button 66 used to display the previous panel in a step wise fashion, a Next button 70 used to display the subsequent panel in a step wise fashion. Furthermore, panel layout 58 includes a Submit button 74 used to compile entered data when all panels have been viewed and to launch a window that shows the final repair configuration, described below in reference to FIG. 13. Further yet, panel layout 58 includes a user input side that displays text, data requests and associated data entry fields, a message center 82 that displays relevant messages to a maintainer, and graphics window 86 used to display various graphics. Still further, panel layout 58 includes additional graphics buttons 90 that allow the maintainer to view various graphics displayed in graphics window 86 in a step wise fashion, and panel tabs 94 that allow the maintainer to advance or revert to a subsequent or previous panel without using the step wise fashion used by the Previous and Next buttons 66 and 70.

In a preferred embodiment, panel tabs 94 include a Location tab, a Location Results tab, a Previous Repair tab, a Damage Type tab, a Non-Destructive Inspection (NDI) tab, a NDI results tab, a Damage Class tab, and a Final Repair tab. Each tab will display an associated panel when the corresponding tab is selected by the maintainer using input device 40 (shown in FIG. 1). It is envisioned that panel tabs 94 could include various other tabs that display panels specifically related to various structures in which system 10 is utilized to disposition damage. For example, panel tabs 94 could also include a Graphical tab.

Damage disposition software package 52 proceeds in a step by step fashion and the maintainer must complete an earlier step in the process before the maintainer can move on to a later step. For example, when the maintainer initially executes software package 52 the only tab 94 that will be available, or that will be enabled, at that time is the Location tab or the Graphical tab. All of the other tabs below the location tab are disabled such that access to those panels is not allowed. The maintainer cannot advance to a subsequent panel until all the data requested in the current panel being viewed is entered. Once the maintainer completes entering all the data requested on the current panel the maintainer selects, or clicks, Next button 70 to advance to the next step in the process.

Submit button 74 does not become available until all panels of damage disposition software package 52 have been completed. Once all panels have been viewed and the requested data entered, the Submit button 74 is selected and system 10 compiles the data and selects an appropriate repair procedure identification (ID) number from a table stored in database 46. Database 46 stores a table of repair procedure IDs that correspond to many different repair procedures. Each repair procedure describes how to perform a specific repair to a specific part of the structure having a specific severity or class of damage. For example, in the case of an aircraft, damage to the stabilator will require a different repair procedure than damage to the fuselage, and damage to different zones of the stabilator will require different repair procedures, and different classes of damage to the same zone of the stabilator will require different repair procedures. Each repair procedure is predefined and given an ID number. All the repair procedure ID numbers are stored in a table in database 46. Based on the data collected at each panel, disposition software package 52 selects the appropriate repair procedure ID when Submit button 74 is selected.

Thus, during execution of the comprehensive damage evaluation program, e.g. the IETMs software program, a certain point in the process identifies that a repair needs to be performed. At this point, any necessary information is uploaded to system 10, system 10 is disconnected from the network, taken the site of the damaged structure, and damage disposition software package 52 is executed. After disposition software package 52 is executed and the Submit button 74 has been selected, system 10, is reconnected to the network, and the compiled data and repair procedure ID is downloaded to the network server. The comprehensive damage evaluation program then uses the downloaded data and repair procedure ID to present the maintainer, an engineer, or a repair person with a step by step repair process specific to the particular damage to be repaired.

If system 10 is a stand alone system, the comprehensive damage evaluation software, or the IETMs software, is stored in database 46 and the comprehensive damage evaluation program is executed by processor 22. When the comprehensive damage evaluation software identifies that a repair needs to be performed, damage disposition software package 52 is executed utilizing information stored in database 46. After disposition software package 52 is executed, thereby determining a repair procedure ID, and the Submit button 74 has been selected, system 10 exits the disposition software package 52 and continues to execute the comprehensive damage evaluation software. The comprehensive damage evaluation program then uses the repair procedure ID to present the maintainer, an engineer, or a repair person with a step-by-step repair process specific to the particular damage to be repaired.

Damage disposition software package 52 incorporates two types of damage location techniques. One technique is based on a coordinate system and the second technique is based on a non-coordinate system. The coordinate technique incorporates either an X and Y axis coordinate system or an X, Y, and Z axis coordinate system. When using the coordinate technique the maintainer utilizes a measuring device, such as a ruler or caliper, to determine one or more location measurements along the various coordinate axis's based on a starting point and an ending point. The coordinate technique includes three methods of obtaining damage location measurement. The general location of the damage determines which one of the methods will be used. The three methods include an interior method used for damage located away from any edge of the damaged part, an edge method for damage located along the edge of the damaged part, and a corner method for damage located on a corner of the damaged part.

When the interior method is used, the measurement starting point is designated by disposition software package 52 to be a point on an edge of the damaged part. The ending point is designated by disposition software package 52 to be a point a distance from the starting point along one axis that is perpendicular to the center of the damage. The maintainer then measures and records the normal (perpendicular) length from the ending point to the center of the damage, and measures and records the diameter of the visible damage. Each axis will have a designated starting point and ending point from which a measurement is obtained. Thus, the damage location is described by a set of coordinates.

When the edge method is used, the measurement starting point is designated by disposition software package 52 to be a corner, and the ending point is the point of damage along a corresponding edge. The maintainer then measures and records the length of the visible damage along the edge and measures and records the depth of the visible damage.

When the corner method is used, a set of coordinates are obtained using the two adjacent corners as starting points and the damaged corner as the ending point. The maintainer measures and records the length from a corner adjacent to the damaged corner along the edge to the beginning of the damage on that edge. Then the maintainer measures and records the length from a second corner adjacent to the damaged corner along the edge to the beginning of the damage on that edge. Finally the maintainer measures and records the maximum depth of the damage.

The non-coordinate technique is utilized when damage occurs to a part on the structure that has an odd or unusual shape, or has a curved edge such that the coordinate technique would not yield accurate damage location measurements. When the non-coordinate technique is used, disposition software package 52 displays a graphic showing the damaged part divided into zones. Within each zone landmarks, such as rivet or seams, are designated, and based on the various landmarks the maintainer determines in which zone the damage is located.

Figure 3:
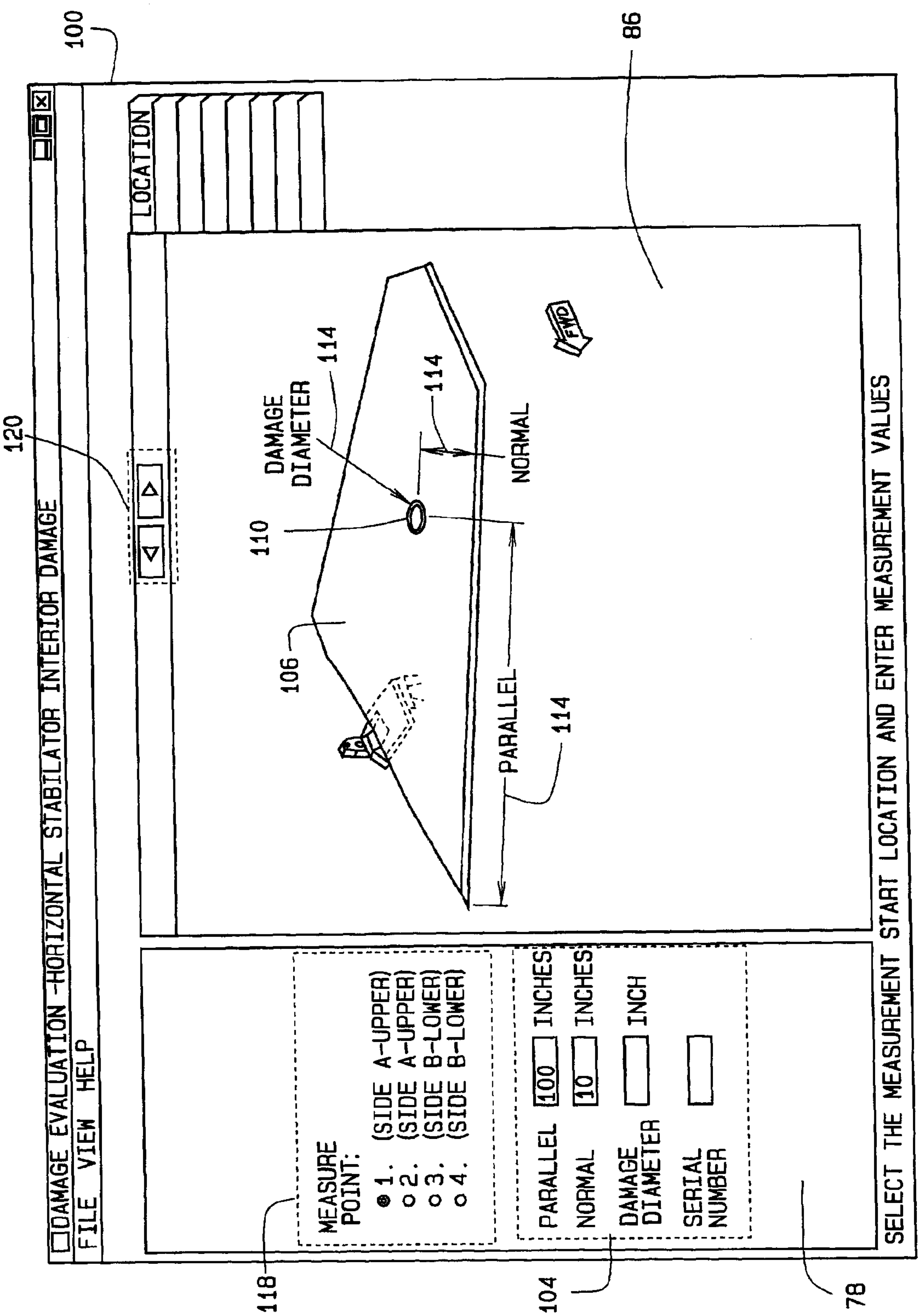
FIG. 3 is an illustration of a Damage Location panel displayed during execution of the disposition software package using the system shown in FIG. 1.

FIG. 3 is an illustration of a Damage Location panel 100 displayed during execution of software package 52 and displayed on display 34. Damage Location panel 100 is utilized only when the coordinate damage location technique is selected. Prior to utilizing system 10, the comprehensive damage evaluation program has identified what part or component of the structure has incurred damage, and the appropriate damage location technique to implement. This information is uploaded, or passed as parameters, to system 10 prior to execution of damage disposition software package 52. Damage Location panel 100 is used to enter data coordinates or measurements describing the location and extent of the damage on the damaged part.

The user input side 78 of Damage Location panel 100 includes damage location parameter fields 104. Location parameter fields 104 include text describing various measurement data needed to describe the location of the damage on the part, a plurality of data input boxes in which the corresponding measurement values are entered by the maintainer, and unit of measure text designating the unit of measure to be used when entering the measurement values. Additionally, the graphics window 86 displays a damage location schematic 106 of the damaged part showing a simulated damage artifact 110 and measurement index lines 114. Artifact 110 and index lines 114 are used to illustrate the measurements requested in user input side 78. Index lines 114 designate the starting and ending points of requested measurements within the coordinate system. Damage artifact 110 is not necessarily located on damage location schematic 106 where the actual damage is located on the actual damaged structure part. Damage artifact 110 is merely a representative area of damage on location schematic 106 used to illustrate how to obtain the measurement values requested in user input side 78.

For example, to obtain a requested Parallel measurement using the interior method, the maintainer views damage location schematic 106, which indicates the starting and ending points on the part between which the Parallel measurement is to be taken, and enters the value of that measurement in the appropriate data input box using the units of measure indicated. In an exemplary embodiment of the interior method, Damage location panel 100 instructs the maintainer to obtain a Parallel measurement which is a measurement along an edge of the part, a normal measurement which is a measurement of the damage location perpendicular to the edge of the part, a diameter of the damage, and a serial number of the damaged part.

Additionally, damage location panel 100 includes measure point selectors 118 that indicate the starting point for the parallel measurement of the part illustrated in schematic 106. When the maintainer first enters Damage Location panel 100, schematic 106 is displayed. The maintainer then selects the appropriate measurement point selector 118, and then proceeds to enter data in the measurement location parameter fields 104.

Furthermore, damage location panel 100 includes an additional measurements button set 120. Additional measurement button set 120 is utilized to view multiple graphics that describe how to measured the damage location or extent.

In a preferred embodiment, the appropriate damage location technique are uploaded, or passed as a parameter, to system 10 prior to executing disposition software package 52. If the coordinate damage location technique is to be utilized, the coordinate method, i.e. interior, edge, or corner method, is specified in the passed parameter to system 10 prior to execution of software package 52.

Figure 4:
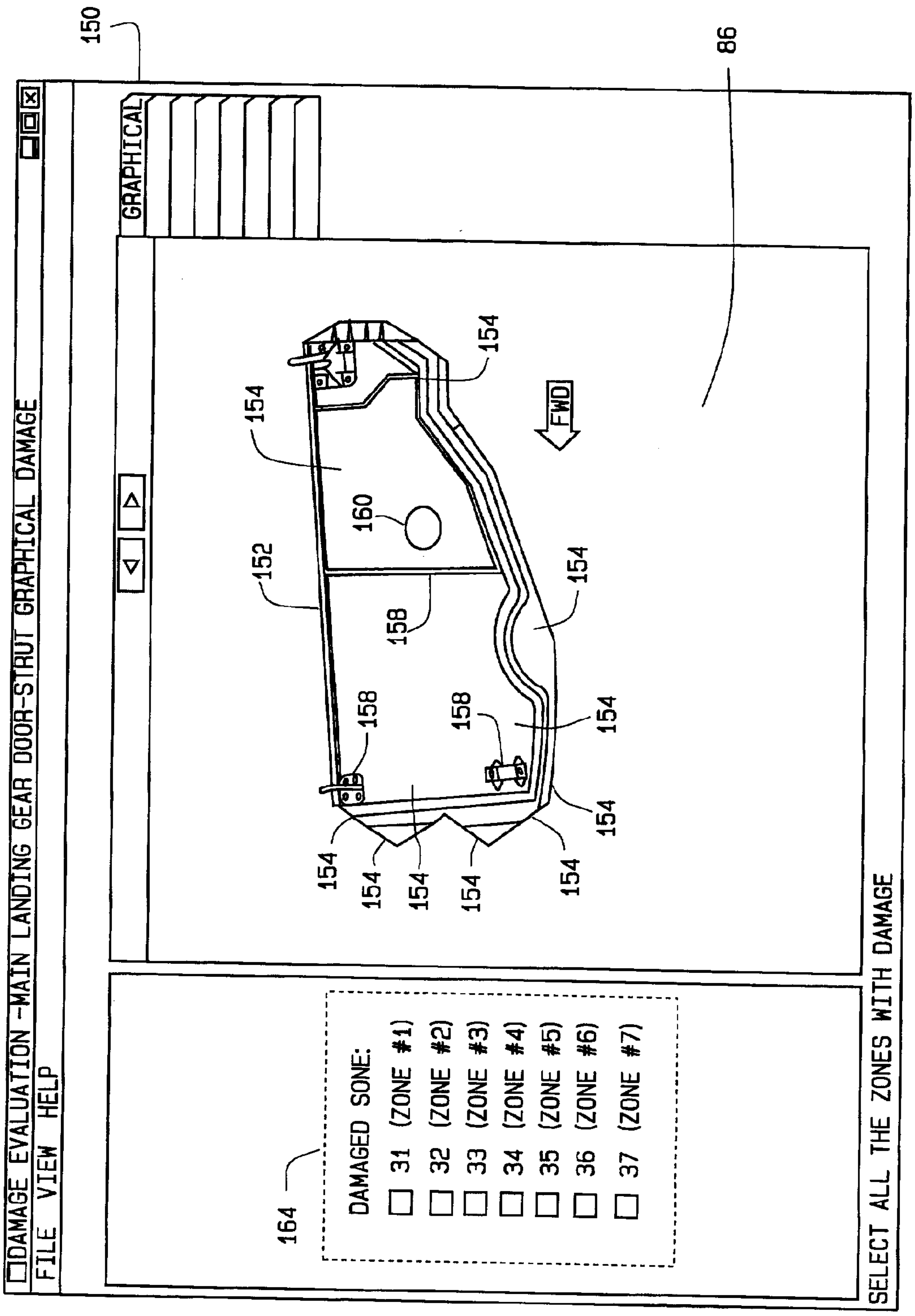
FIG. 4 is an illustration of a Graphical Damage panel displayed during execution of the disposition software package using the system shown in FIG. 1.

FIG. 4 is an illustration of a Graphical Damage panel 150 displayed during execution of software package 52 and displayed on display 34. Graphical Damage panel 150 is used to specify the damage location on the part by visual inspection and is utilized only when the non-coordinate damage location technique is selected. In the graphics window 86 of Graphical Damage panel 150 a graphical representation 152 of the damaged part is illustrated having designated zones 154 identified. Landmarks 158, such as rivet or seams, and a simulated damage artifact 160 are also identified in graphic representation 152. Based on the various landmarks 158 the maintainer determines in which zone 154 the damage is located and selects a corresponding zone selector 164 shown in the user input side 78 of Graphical Damage panel 150.

Figure 5:
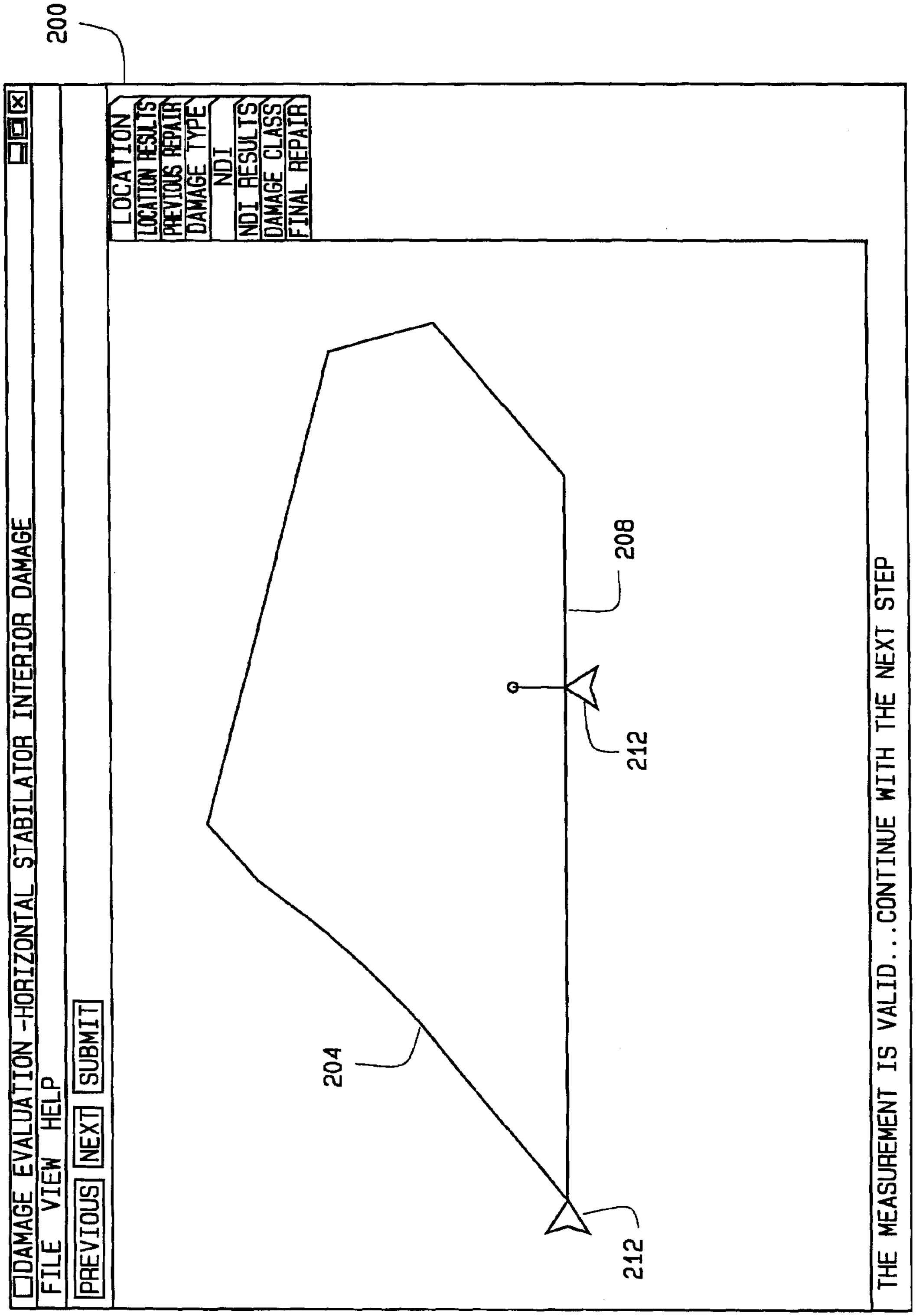
FIG. 5 is an illustration of a Damage Location Results panel displayed during execution of the disposition software package using the system shown in FIG. 1.

FIG. 5 is an illustration of a Damage Location Results panel 200 displayed during execution of software package 52 and displayed on display 34. Damage Location Results panel 200 displays an illustration 204 used to visually show the maintainer the location of damage on the part, as specified by data input in Damage Location panel 100. Damage Location Results panel 200 is only displayed if the coordinate damage location technique is utilized. Based on the data inputs entered in Damage Location panel 100, disposition software package 52 creates illustration 204 of the damaged part and shows the location of a simulated damage artifact 208. Arrows 212 indicate where measurements were taken to obtain the data inputs entered in Damage Location panel 100. Additionally, simulated damage artifact 208 graphically shows the approximate size of the damage scaled with respect to illustration 204. Damage Location Results panel 200 allows the maintainer to graphically review the results of the data inputs entered in previous panels.

In a preferred embodiment, Damage Location Results panel 200 is also used to check the location of the damage against engineering disposition only (EDO) zones. EDO zones are zones within the part that are not visible to the maintainer and not repairable utilizing system 10. If simulated damage artifact indicates that the damage is within an EDO zone, the evaluation stops and an Engineering Disposition Only (EDO) dialog box appears indicating that the damage is in an EDO zone. The EDO dialog box is described further below in reference to FIG. 14.

Figure 6:
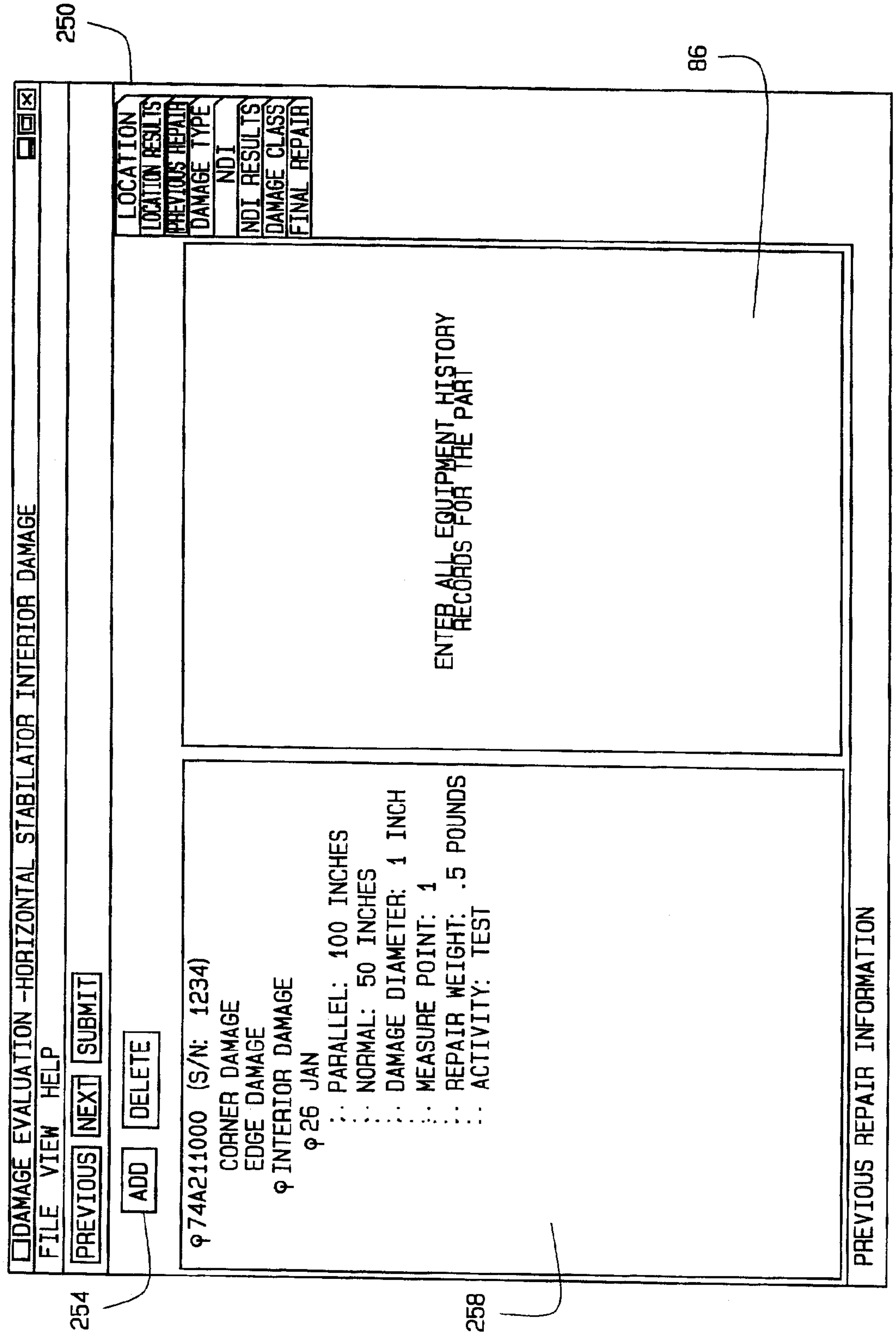
FIG. 6 is an illustration of a Previous Repair panel displayed during execution of the disposition software package 52 using the system shown in FIG. 1.

FIG. 6 is an illustration of a Previous Repair panel 250 displayed during execution of software package 52 and displayed on display 34. Previous Repair panel 250 allows the maintainer to enter all previous repairs for the part based on an equipment history record (not shown). When determining whether a part can be repaired or the type of repair that should be performed the repair history of the part must be considered. Previous Repair panel 250 allows the maintainer to make entries that indicate the position and the size of repairs that have already been done on the part. Previous Repair panel 250 is only displayed if the coordinate damage location technique is utilized. When Previous Repair panel 250 is opened and message requesting the entry of all history records for the part is displayed in graphics window 86

Previous Repair panel 250 includes an Add button 254 and a tree structure window 258 that show the previous repairs. In a preferred embodiment, the maintainer selects Add button 254 when wanting to enter previous repair data. When Add button 254 is selected a previous repair dialog box is displayed. The previous repair dialog box is described further below in reference to FIG. 7. The maintainer then enters previous repair data from the equipment history record. In an alternate embodiment, previous repair data is stored in a network database and uploaded via the network server to electronic storage device 28 prior to execution of disposition software package 52. In another alternate embodiment, previous repair data is stored in database 46 and retrieved during execution of disposition software package 52.

Figure 7:
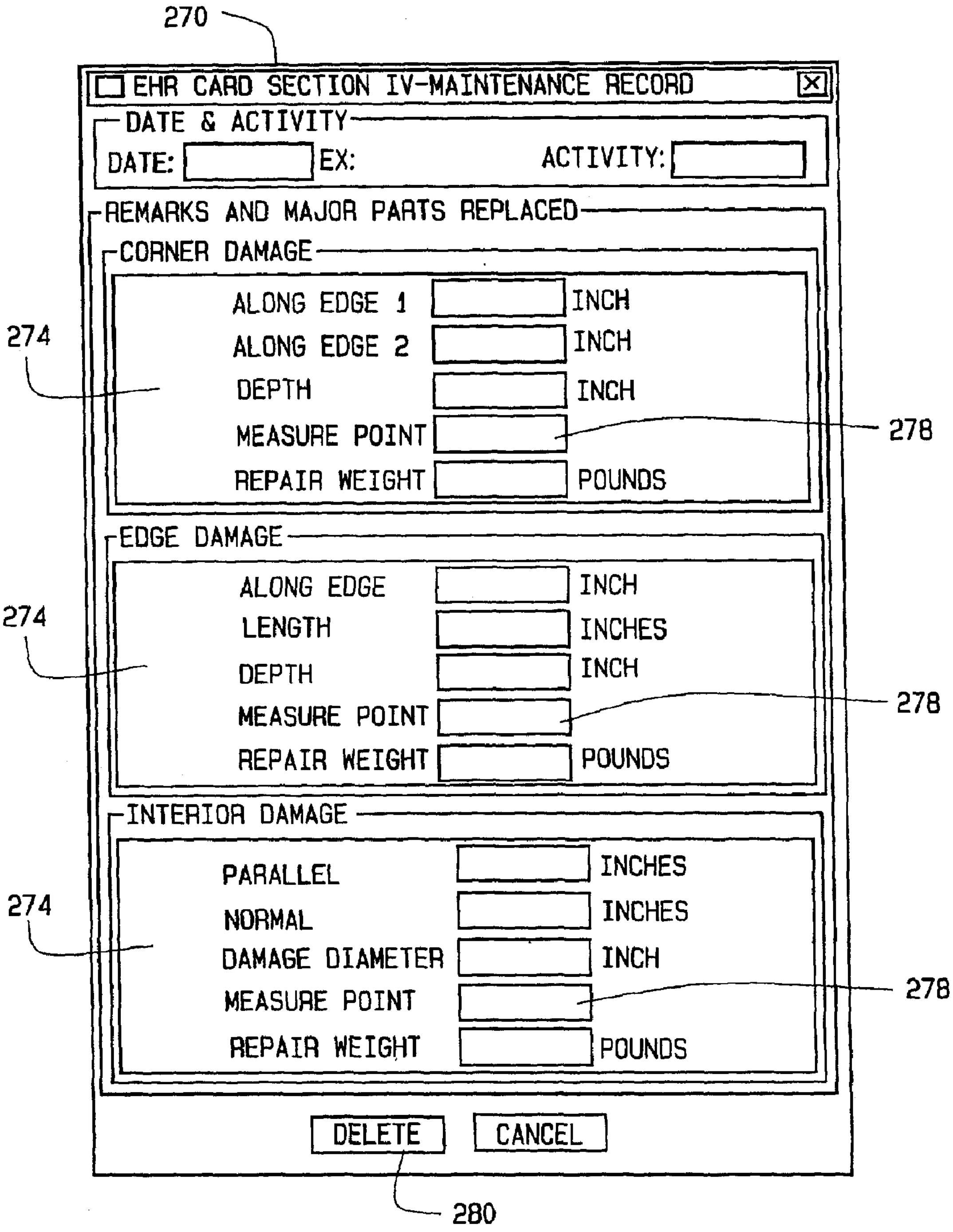
FIG. 7 is an illustration of a Previous Repair dialog box displayed during execution of the disposition software package 52 using the system shown in FIG. 1.

FIG. 7 is Previous Repair dialog box 270 displayed when the Add button 254 (shown in FIG. 6) is selected. Previous Repair dialog box 270 allows the maintainer to enter previous repair information from equipment history record. The maintainer determines whether the previous damage occurred at a corner, on an edge, or in the interior surface area of the part, then enters the requested data. The requested data is shown in data sections 274 that include data entry fields 278 wherein the maintainer enters the requested data. Generally, the same type of information is entered in Previous Repair dialog box 270 as is entered in Damage Location panel 100. Additionally, Previous Repair dialog box includes a Delete button 280 that allows the maintainer to delete a selected entry.

Figure 8:
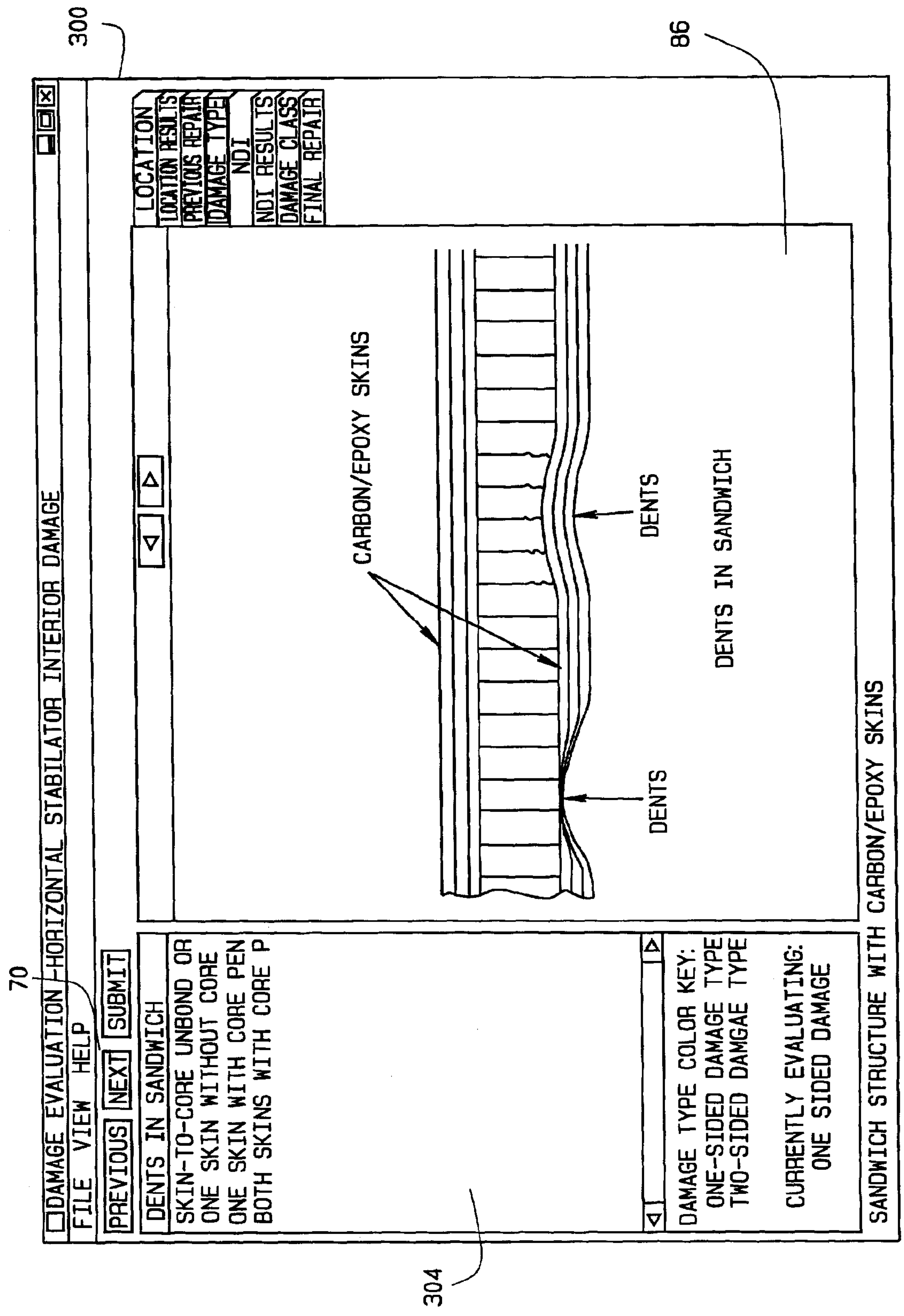
FIG. 8 is an illustration of a Damage Type panel displayed during execution of the disposition software package using the system shown in FIG. 1.

FIG. 8 is an illustration of a Damage Type panel 300 displayed during execution of software package 52 and displayed on display 34. Damage Type panel 300 is used to select a damage type that best represents the damage on the part. A list of available damage types, specific to the damaged part, are presented in a damage type window 304. The maintainer selects a damage type from window 304 and a corresponding graphical depiction of the selected damage type will appear in graphics window 86. The graphical depiction illustrates how the selected damage type would visually appear on the specific damaged part and identifies the illustrated areas of damage and various components of the damage part. The maintainer reviews the graphical depiction and compares it to the actual damage to the part. If graphical depiction does not match the actual damage, the maintainer will select another damage type from the damage type window 304 and the corresponding graphical depiction will appear. The maintainer continues to select different damage types until an appropriate graphic is found that matches the actual damage. Once an appropriate graphic is found, the maintainer continues to the next panel by selecting Next button 70.

The initial measurements defining the location and size of the damage, obtained and entered in Damage Location panel 100, are acquired based on visual observations using measuring devices such as a ruler or caliper. However, there may be damage that extends inside the part that is not visible to the maintainer, and may require the use of electronic equipment, such as an x-ray device, to properly disposition the damage. The visual observation measurements and information entered in Damage Location panel 100 and subsequent panels are used to determine whether the damage is expected to be repairable.

Thus, when Next button 70 is selected in Damage Type panel 300, if disposition software package 52 determines the damage is not repairable, the Engineering Disposition Only dialog box, described further below in reference to FIG. 14, appears informing the maintainer to either exit the evaluation or correct previous data input. If the maintainer chooses to correct previous data input, the maintainer merely selects the previous panel tabs 94, reviews the data entered and makes the appropriate corrections. If after selecting Next button 70 in Damage Type panel 300 the disposition software package 52 determines that based on the data input to this point the damage is repairable, a Non-Destructive Inspection panel 350, described below, will appear and the maintainer will proceed accordingly.

Figure 9:
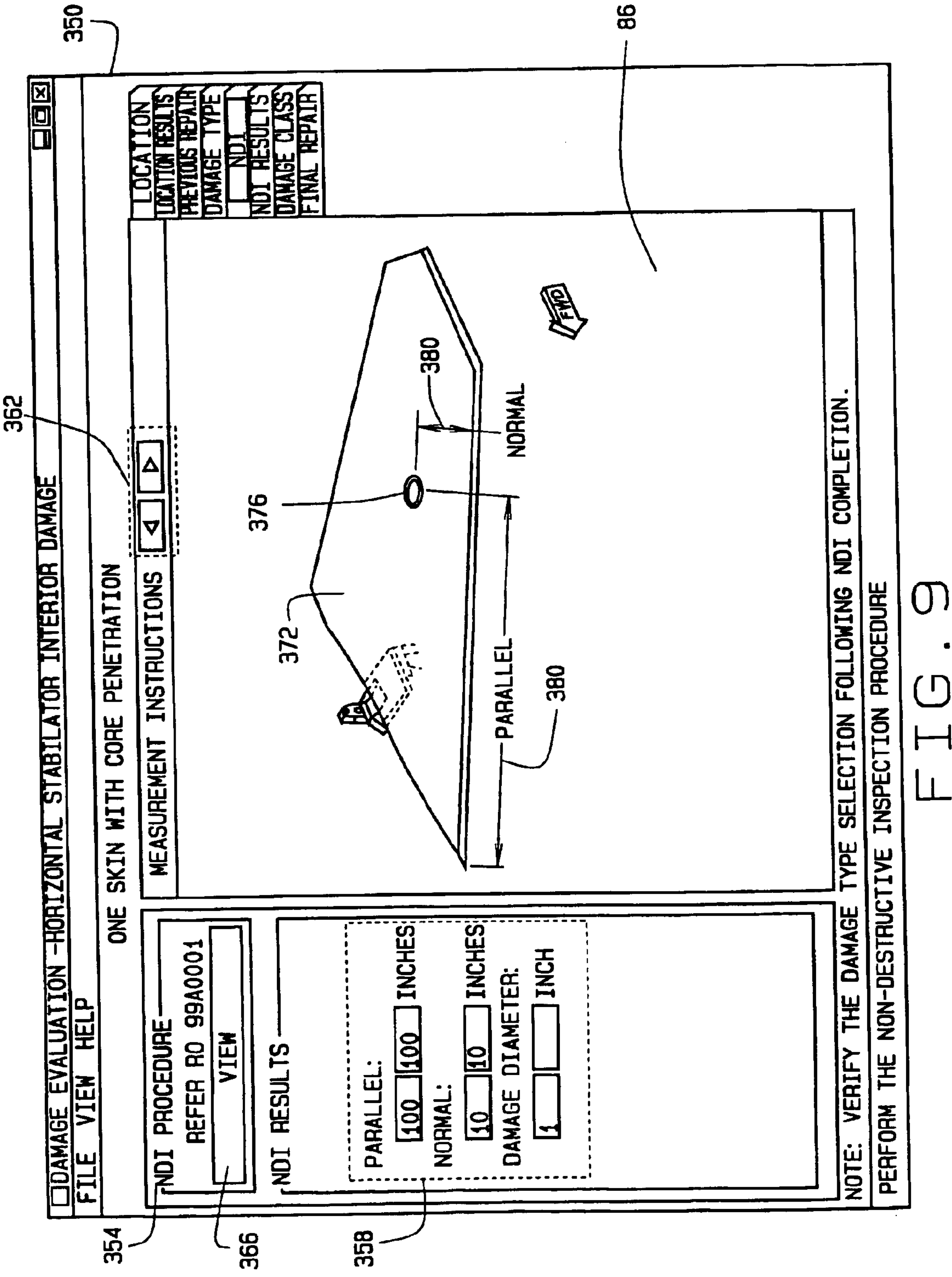
FIG. 9 is an illustration of a Non-Destructive Inspection panel displayed during execution of the disposition software package using the system shown in FIG. 1.

FIG. 9 is an illustration of a Non-Destructive Inspection (NDI) panel 350 displayed during execution of software package 52 and displayed on display 34. NDI panel 350 is used to more accurately define the specific location and size of the damage. However, there are some damage types that a visual inspection is enough and a more detailed inspection is not required. For example, if there was merely a surface scratch on the part a visual inspection of that scratch would give enough detailed information about the location and the actual size of the damage. In the case where the visual measurements obtained are determined by disposition software package 52 to be a sufficient assessment of the damage, selecting Next button 70 in Damage Type panel 300 will present a Damage Class panel, described further below in reference to FIG. 11, to the maintainer.

NDI panel 350 includes a NDI procedure window 354, NDI location parameter fields 358 and an additional measurement button set 362. NDI procedure window 354 includes a View button 366. Additionally, graphics window 86 displays a damage location schematic 372 of the damaged part showing a simulated damage artifact 376 and measurement index lines 380. Schematic 372 is essentially the same as schematic 106 displayed in Damage Location panel 100. When NDI panel 350 appears, a NDI procedure reference number will be shown in NDI procedure window 354. The NDI reference number identifies a specific NDI procedure that delineates a procedure to obtain more accurate measurements than the visual measurements entered in prior panels. NDI procedures involve the use of electronic measuring equipment that produce highly accurate measurements to define the location and size of the damage. Each NDI procedure is specific to a particular structure part and the type of damage to that part, which information is obtained in prior panels of disposition software package 52. In a preferred embodiment, NDI procedures are stored in database 46 and are viewed by selecting View button 366. In an alternate embodiment, the NDI procedures are stored in a network database and must be retrieve by any suitable method such as a wireless modem, or directly connecting system 10 to the network. In another alternate embodiment, the NDI procedures are stored in manuals and must be physically retrieved by the maintainer.

NDI location parameter fields 358 include text describing various measurement data requested to describe the location of the damage on the part, a plurality of data input boxes in which the corresponding measurement values are entered by the maintainer, and unit of measure text designating the unit of measure to be used when entering the measurement value. The location parameter fields also include text displaying the respective measurements previously entered in Damage Location panel 100. Thus, when NDI panel 350 is displayed, the NDI procedure reference number for the specific part and type of damage is designated in NDI procedure window 354, and the maintainer then selects View button 366. Upon selecting View button 366 the proper NDI procedure, from the IETMs, is displayed. The procedure is displayed in a step wise fashion and the maintainer follows the steps to obtain damage location and size data, which is then entered in NDI location parameter fields 358. Additional graphics relating to the procedure and requested measurements can be viewed using the additional measurement button set 362.

Figure 10:
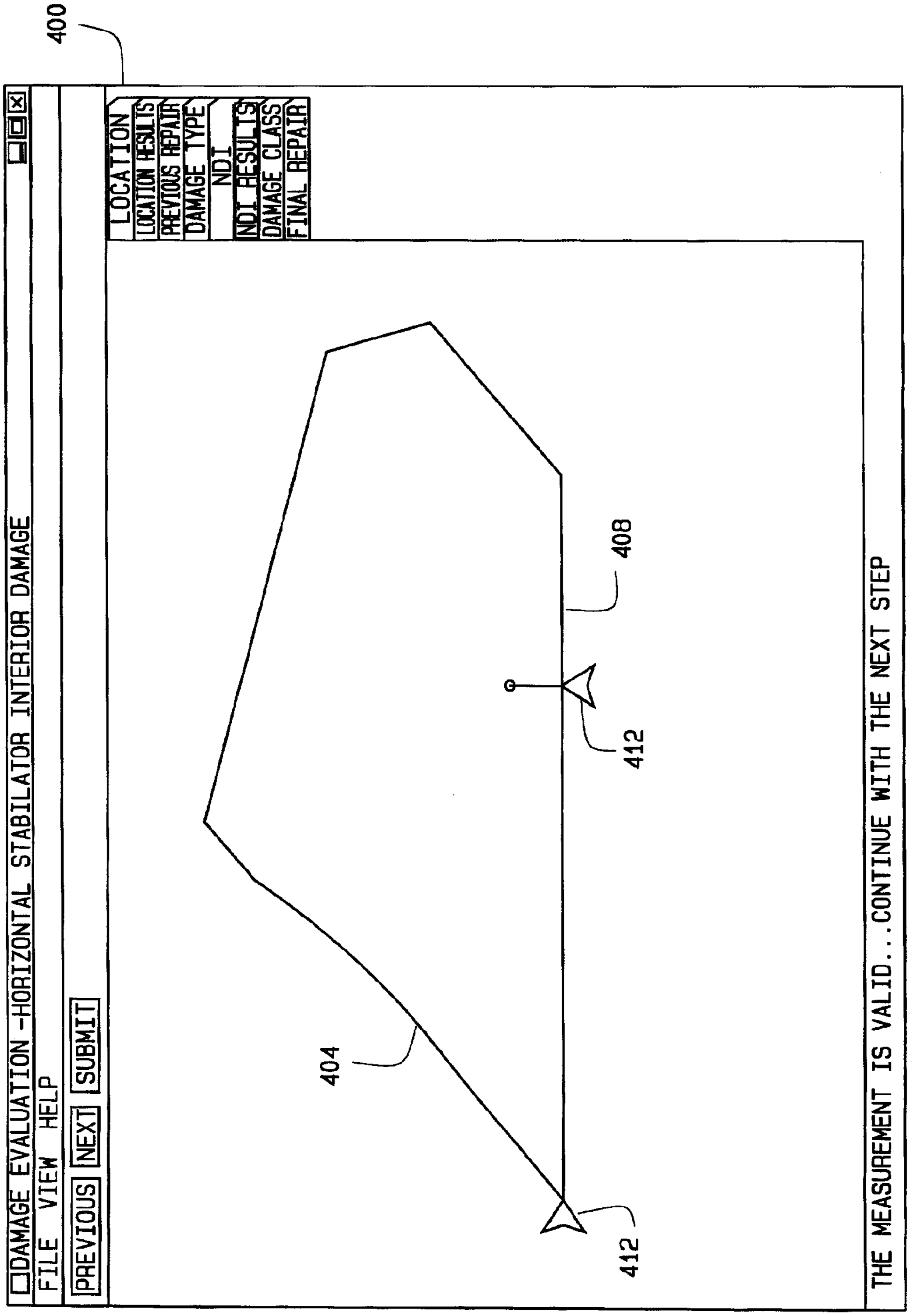
FIG. 10 is an illustration of a Non-Destructive Inspection Results panel displayed during execution of the disposition software package using the system shown in FIG. 1.

FIG. 10 is an illustration of a NDI Results panel 400 displayed during execution of software package 52 and displayed on display 34. NDI Results panel 400 is very similar to Damage Location Results panel 200. NDI Results panel 400 displays an illustration 404 used to visually show the maintainer the location of the damage on the part based on the NDI measurement entered in NDI panel 350. Using the data inputs entered in NDI panel 350, disposition software package 52 creates illustration 404 of the damaged part and shows the location of a simulated damage artifact 408. Arrows 412 indicate where measurements were taken to obtain the data inputs entered in NDI panel 400. Additionally, simulated damage artifact 408 graphically shows the approximate size of the damage scaled with respect to illustration 404. NDI Results panel 400 allows the maintainer to graphically review the results of the data inputs entered in previous panels.

In a preferred embodiment, NDI Results panel 400 is also used to check the location of the damage against engineering disposition only (EDO) zones. If simulated damage artifact indicates that the damage is within an EDO zone, the evaluation stops and the Engineering Disposition Only (EDO) dialog box, described further below in reference to FIG. 14, appears indicating that the damage is in an EDO zone.

Figure 11:
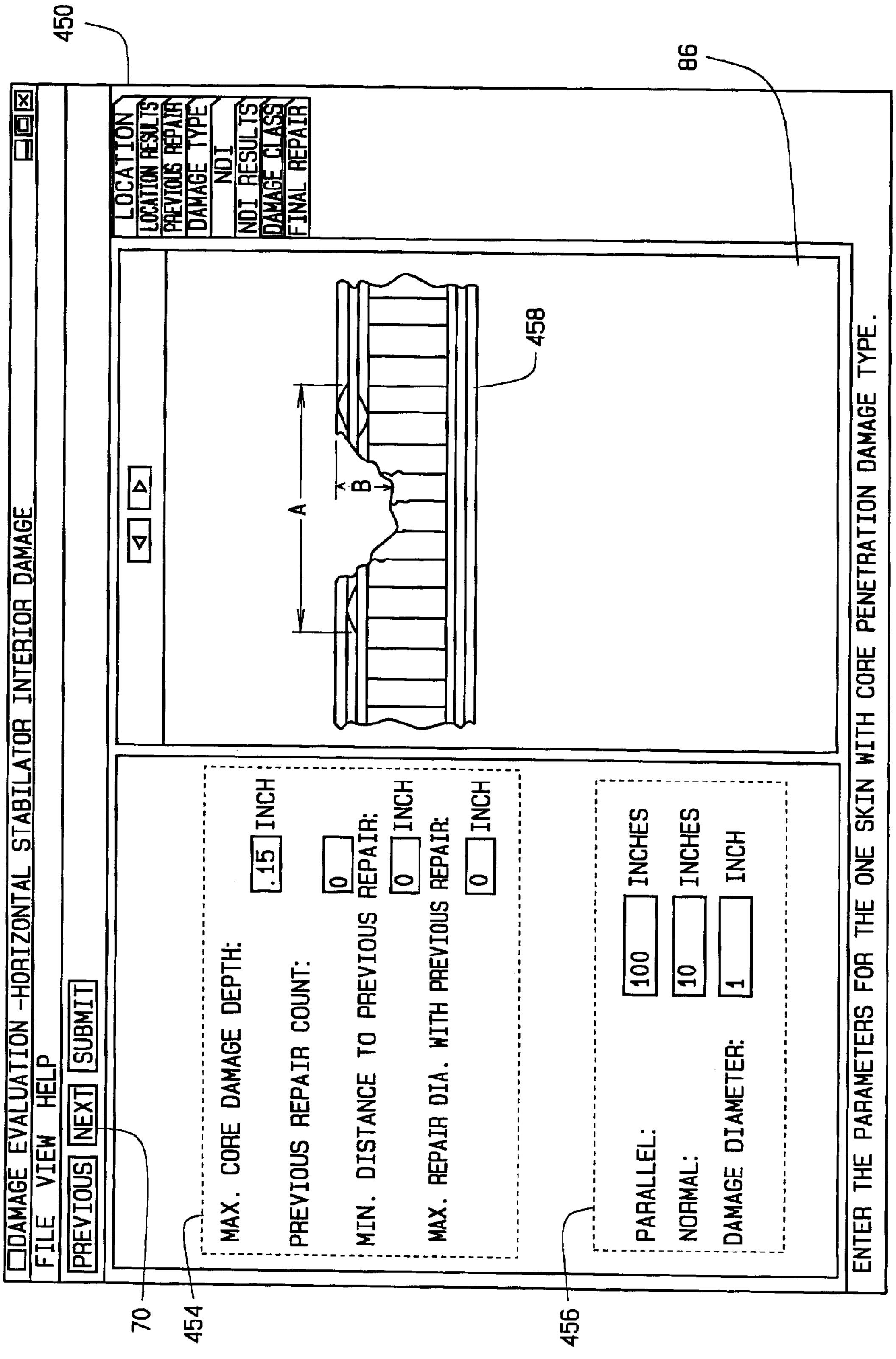
FIG. 11 is an illustration of a Damage Class panel displayed during execution of the disposition software package using the system shown in FIG. 1.

FIG. 11 is an illustration of a Damage Class panel 450 displayed during execution of software package 52 and displayed on display 34. Damage Class panel 450 is used to enter specific parameters for determining a damage class. Damage classes designate various different levels of damage ranging from mild to extreme. Each damage type, as determined using Damage Type panel 300, is further defined using the various damage classes. For example, Damage Type panel 300 may determine the damage type is a scratch in one skin without core penetration. The scratch may be classified as a minor scratch, a deep scratch, or a long scratch. If the damage is determined to be within a more extreme class, the damage type may be re-designated to a more severe damage type, for example, one skin penetration with core damage.

Prior to entering Damage Class panel 450 disposition software package 52 defines the damage as minor. That is, the damage class evaluation performed using Damage Class panel 450, starts with the most basic type of damage class within a damage type. Damage Class panel 450 includes damage class parameter fields 454 that are used to describe requested data and allow the maintainer to enter the requested data. Additionally, Damage Class panel 450 includes a NDI measurement window 456 that displays the data entered in NDI panel 350 and an illustration 458 showing a simulated area of damage. Illustration 458 is shown in graphics window 86 and graphically assists in describing the data requested in class parameter fields 454.

Initially, class parameter fields 454 describe requested data inputs associated with the most minor damage class within the damage type determined in Damage Type panel 300. When data is input to all class parameter fields 454, and Next button 70 is selected, disposition software package 52 applies the data to a set of damage class determination rules stored in database 52. The class determination rules determine whether the damage is more extensive than what is allowed for the current damage class or satisfies all conditions of the current damage class. If any condition fails, class parameter fields 454 automatically change to describe requested data inputs associated with a subsequent more severe damage class within the damage type, and the process is repeated. The data requested in class parameter fields 454 for one class is not necessarily the same data requested in class parameter fields of a subsequent class. If the class determination rules determine that the damage is too severe to satisfy the most extreme damage class within the damage type, software package 52 automatically selects the next damage class, or damage type, to evaluate, and the process is repeated until disposition is reached.

The class determination rules are a set of conditions associated with each class that are applied to each class parameter field 454. For example, if one of the class parameter fields is Maximum Core Damage Depth and the data input was 0.15 inches, there is a rule associated with this damage class that stipulates a maximum value allowable, e.g. 0.20 inches, for the maximum core damage depth within the specific damage type. If the data input by the maintainer is less than 0.20 inches then that condition is met, but if the data input exceed 0.20 inches then the rule fails and a more severe damage class is evaluated.

The rules are associated with each damage class within each damage type. The inputs are evaluated by the rules and a true or false value is determined. If every rule that is associated with a damage class evaluates true, then the correct damage class has been determined, and that class is used to determine the appropriate repair procedure to repair the damaged part. If one rule fails either a subsequent class is evaluated or the damage type is re-designated. Also, application of the rules to a set of data in class parameter fields 454 could result in a rule failure that indicates an EDO condition, at which point the EDO dialog box, described further below in reference to FIG. 14, appears.

Furthermore, the rules associated with each damage class are applied in a specific order. Thus, failure of a specific rule will result in advancing to a subsequent damage type without application of a rule later in the order. For example, if the first rule fails class parameter fields 454 may advance to a damage class A, but if the first rule passes and the second rule fails, class parameter fields may advance to a damage class E.

Figure 12:
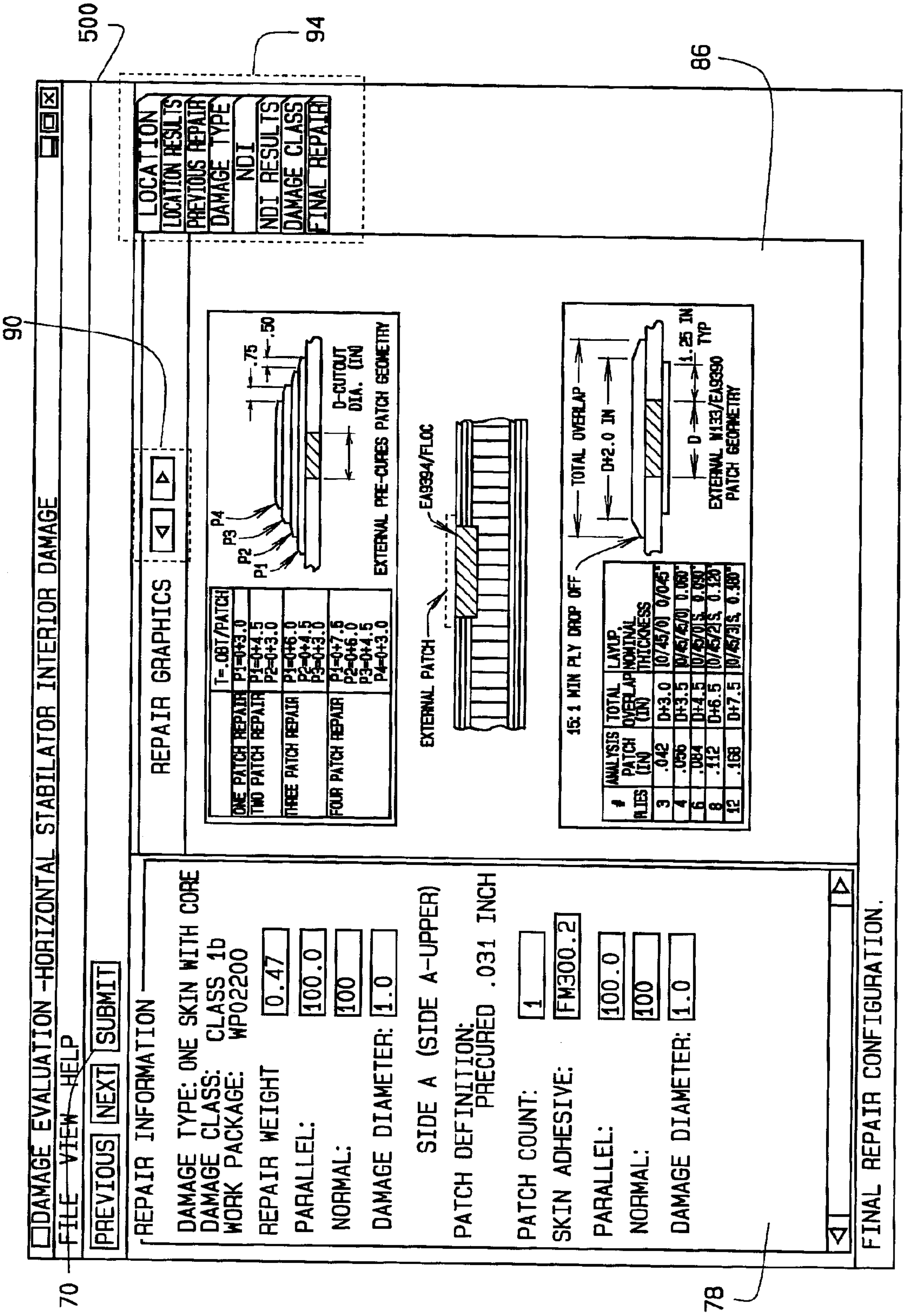
FIG. 12 is an illustration of a Final Repair Configuration panel displayed during execution of the disposition software package using the system shown in FIG. 1.

FIG. 12 is an illustration of a Final Repair Configuration panel 500 displayed during execution of software package 52 and displayed on display 34. Final Repair Configuration panel 500 is used to display specific information to be utilized during performance of procedural steps used to implement the repair procedure designated by disposition software package 52 as the required repair procedure for the identified damage in the specified part. Final Repair Configuration panel 500 displays information that is stored in database 46 and user input from previous panels, which the maintainer can use while performing the required repair. There are no inputs required in Final Repair Configuration panel 500. Final Repair Configuration panel 500 will display repair information in text form in user input side 78, and in graphical form in graphics window 86. For example, information displayed in user input side 78 may designate a patch type, number of patches and type of adhesive to be used to perform the repair, while information displayed in graphics window 86 may show how to locate the patch over the damaged area. Additional graphics buttons 90 are used to scroll in a step wise manner between graphical repair information displayed in graphics window 86.

In one preferred embodiment, in which system 10 is a stand alone system, once Final Repair Configuration panel 500 is displayed, the maintainer selects Submit button 74. When Submit button 74 is selected the maintainer can no longer change any data inputs. At this point the damage disposition software package 52 is exited leaving only a Submit panel, described further below in reference to FIG. 13, displayed. Additionally, the repair data and required repair procedure designation, as determined by disposition software package 52, are passes as parameters to the comprehensive damage repair program. Subsequently the execution of the comprehensive damage repair program, e.g. the ITEMs software, is continued and procedural steps for performing the required repair are displayed Thus, disposition software package 52 only determines a required repair procedure designation. The repair procedure designation is passes as parameters to the comprehensive damage repair program, and the corresponding repair procedure steps are retrieved from database 46 and displayed on network display 34.

Figure 13:
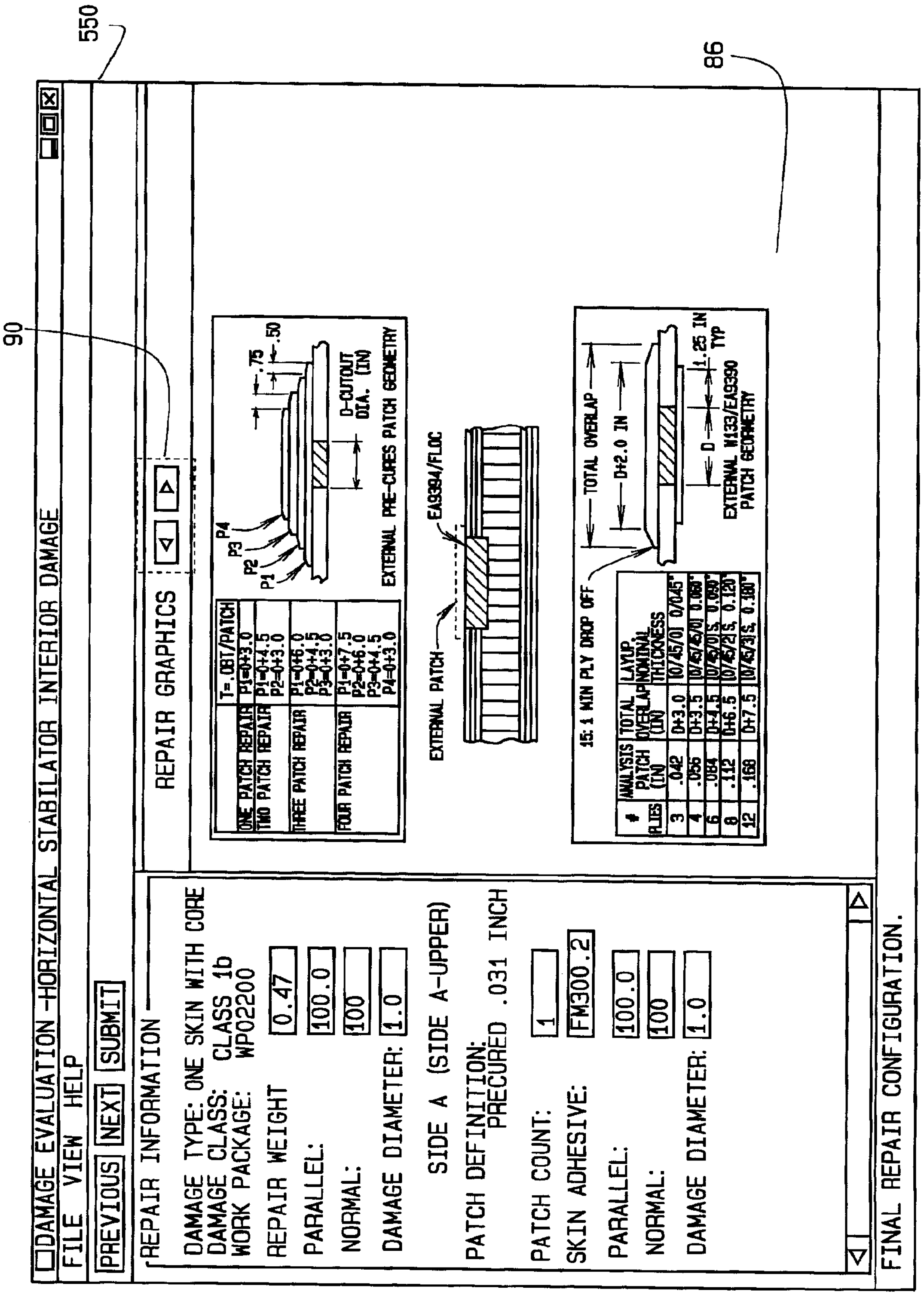
FIG. 13 is an illustration of a Submit panel displayed during execution of the disposition software package using the system shown in FIG. 1.

In another preferred embodiment, in which system 10 is a sub-system of a network, once Final Repair Configuration panel 500 is displayed, the maintainer connects system 10 to the network and selects Submit button 74. When Submit button 74 is selected the maintainer can no longer change any data inputs, and the repair data and required repair procedure designation, as determined by disposition software package 52, are downloaded to the network server. Additionally, panel tabs 94 are disabled, and a Submit panel, described further below in reference to FIG. 13, is displayed. Procedural steps for performing the required repair, as delineated by the IETMS, are stored in the network database. Thus, disposition software package 52 only determines a required repair procedure designation. The repair procedure designation is downloaded to the network server, and the corresponding repair procedure steps are retrieved from the network database and either printed out or displayed on a network display.

FIG. 13 is an illustration of a Submit panel 550 displayed during execution of software package 52 and displayed on display 34. Submit panel 550 is displayed upon selection of Submit button 74 in Final Repair Configuration panel 500. Submit panel 550 displays the exact same information displayed in Final Repair Configuration panel 500 only in a stand alone window without panel tabs 94. However, additional graphics buttons 90 are still active to allow the maintainer to view a plurality of graphics displayed in graphics window 86. The maintainer, an engineer, or a repair person can view Submit panel 550 along with the required repair procedure steps while performing the repair.

Figure 14:
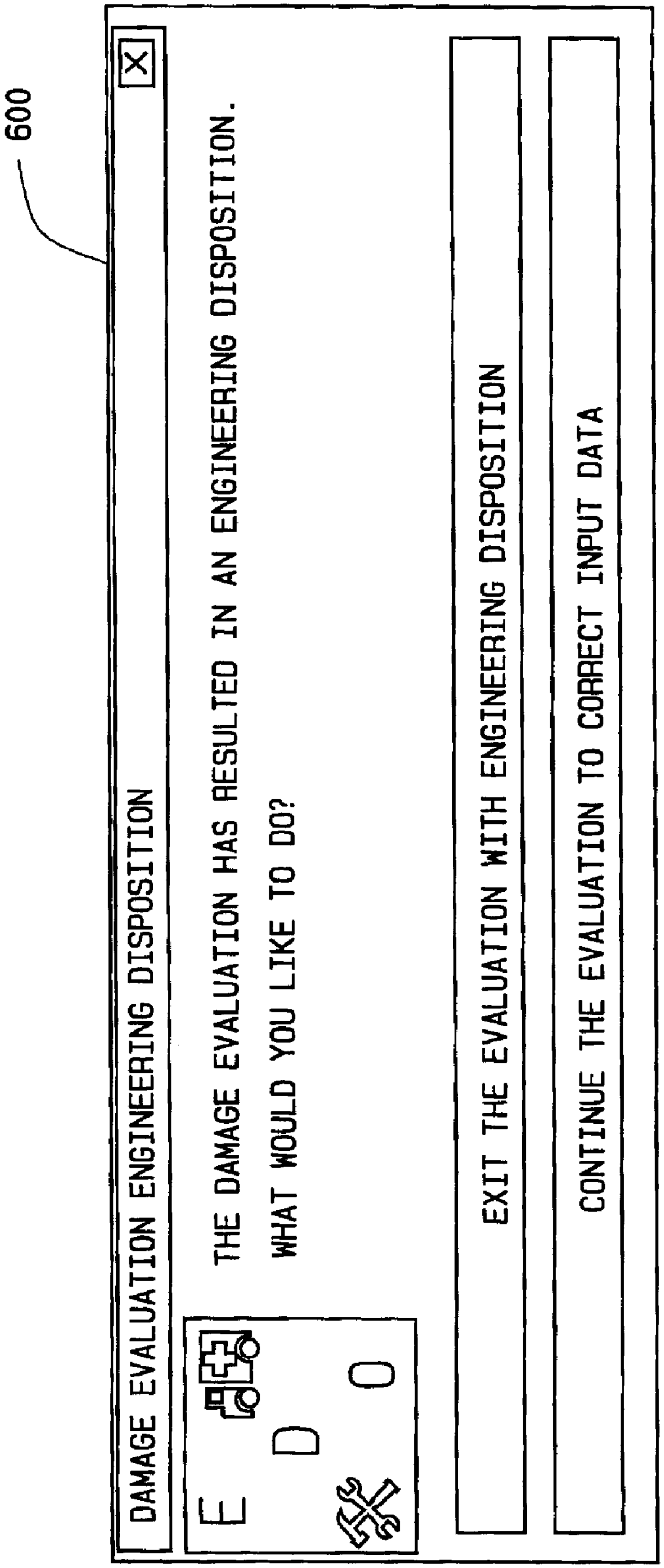
FIG. 14 is an Engineering Disposition Only dialog box that may be displayed during execution of the software package using the system shown in FIG. 1.

FIG. 14 is an Engineering Disposition Only (EDO) dialog box 600 that may be displayed during execution of software package 52 and displayed on display 34. As described above, EDO panel 600 may be displayed at various times throughout the execution of disposition software package 52 where it is determined that the damage is not repairable utilizing software package 52. For example, if the maintainer measures the damage and the damage is located in an EDO zone. Another example would be if one of the class rules fails and there is no evaluation that can be done beyond the current damage class. When EDO dialog box 600 is displayed, the maintainer has two options. The maintainer can either select an Exit the Evaluation with Engineering Disposition button 604, thereby exiting the evaluation, or select a Continue the Evaluation to Correct Input Data button 608, which closes EDO dialog box 600 allowing the maintainer to select a panel tab 94 to view a previous panel and correct data previously entered.

While the invention has been described in terms of various specific embodiments, those skilled in the art will recognize that the invention can be practiced with modification within the spirit and scope of the claims.

What is claimed is:

1. A system for analyzing damage to a structure, said system comprising:

a processor;

a damage disposition program executed by said processor, said damage disposition program operating to determine an appropriate repair procedure that describes how to perform a specific repair to said structure determined by said damage disposition program to have damage within a specific damage class; and a predefined set of damage class determination rules stored in a database accessible by said damage disposition program to determine said damage class.

2. The system of claim 1, wherein said system further comprises a processor-user interface configured to display a plurality of interactive panels generated by execution of said damage disposition program by said processor, wherein at least one of said panels comprises at least one data entry field, and said processor-user interface is further configured to input data in said data entry field.

3. The system of claim 2, wherein upon execution said damage disposition program generates a subsequent one of said panels based on the input data, and determines a location and size of the damage.

4. The system of claim 2, wherein at least one of said interactive panels comprises a graphics window for graphically illustrating at least one of a structure part schematic and damage disposition information.

5. The system of claim 2, wherein upon execution said damage disposition program operates to apply said damage class determination rules to the input data and determines a damage class of the damage.

6. The system of claim 5, wherein upon execution said damage disposition program operates to utilize said input data, said damage class, and a set of previous repair data to determine the appropriate repair procedure for repairing the damage.

7. The system of claim 6, wherein said data entry field in at least one said panel is configured to have said previous repair data input via said processor-user interface.

8. The system of claim 6, wherein said system further comprises a database configured to store said previous repair data, and wherein upon execution said damage disposition program operates to retrieve said previous repair data from said database, via said processor.

9. The system of claim 6, wherein said previous repair data is stored in a remote computer-based network system database and said previous repair data is uploaded to said system prior to said processor executing said damage disposition program.

10. The system of claim 2, wherein said system operates to pass said input data and said repair procedure to a comprehensive damage repair program executed by a remote computer-based network system.

11. The system of claim 2, wherein said system operates to pass said input data and said repair procedure to a comprehensive damage repair program executed by said system processor.

12. A method for analyzing damage to a structure utilizing a system including a processor, a processor-user interface, a database, a damage disposition program, and a predefined set of damage class determination rules, said method comprising:

executing the damage disposition program utilizing the processor;

inputting data in a plurality of interactive panels generated by execution of the damage disposition program and displayed on the processor-user interface; and determining an appropriate repair procedure utilizing the damage disposition program and the input data, the repair procedure describing how to perform a specific repair to the structure determined by the damage disposition program to have damage within a specific damage class.

13. The method of claim 12 wherein at least one of the interactive panels includes at least one data entry field, and wherein inputting data comprises entering data in the data entry field using the processor-user interface.

14. The method of claim 12, wherein at least one of the interactive panels includes a graphics window for presenting a graphical illustration of at least one of a structure part schematic and damage disposition information, and wherein inputting data comprises:

viewing the graphical illustration; and utilizing the graphical illustration to obtain the input data.

15. The method of claim 12, wherein executing the damage disposition comprises;

generating a subsequent one of the interactive panels based on the data input in previous interactive panels; and determining a location and size of the damage based on the data inputs.

16. The method of claim 15, wherein the data entry field in at least one interactive panel comprises a previous repair data entry field, and wherein inputting data further comprises entering previous repair data using the processor-user interface.

17. The method of claim 12, wherein executing the damage disposition program comprises retrieving previous repair data stored in the database.

18. The method of claim 12, wherein the system further includes an electronic storage device, and wherein executing the damage disposition program comprises:

uploading previous repair data to the electronic storage device prior to executing the damage disposition program; and retrieving the uploaded previous repair data from the electronic storage device.

19. The method of claim 12, wherein determining an appropriate repair procedure comprises:

applying the damage class determination rules to the input data to determine a damage class; and utilizing the input data, the damage class and previous repair data to determine the appropriate repair procedure.

20. The method of claim 12, wherein executing the damage disposition program comprises passing the appropriate repair procedure to a comprehensive damage repair program executed by a remote computer-based network system.

21. The method of claim 12, wherein executing the damage disposition program comprises passing the appropriate repair procedure to a comprehensive damage repair program executed by the system processor.

22. A method for using a computer to determine an appropriate repair procedure for repairing a damaged structure comprising:

displaying a plurality of interactive panels on a processor-user interface, at least one of said interactive panels including at least one data entry field;

receiving input data entered into said data entry field using said processor-user interface;

applying a set of damage class determination rules, stored in a database of said computer, to said input data, thereby determining a class of damage to said structure; and determining an appropriate repair procedure based on said input data, said damage class and previous repair data, said appropriate repair procedure describing how to perform a specific repair to said structure based on said damage class determination.

23. The method of claim 22, wherein displaying a plurality of interactive panels comprises providing instructions interpretable by the computer to instruct the computer to display at least one of said interactive panels having a graphics window for presenting a graphical illustration of at least one of a structure part schematic and damage disposition information, said graphical illustration being used to obtain said input data.

24. The method of claim 22, wherein displaying a plurality of interactive panels comprises providing instructions interpretable by the computer to instruct the computer to:

generate a subsequent one of said interactive panels based on said data input in previous said interactive panels; and determine a location and size of the damaged to the structure based on the data inputs.

25. The method of claim 22, wherein determining an appropriate repair procedure comprises providing instructions interpretable by the computer to instruct the computer to receive previous repair data input using the processor-user interface.

26. The method of claim 22, wherein determining an appropriate repair procedure comprises providing instructions interpretable by the computer to instruct the computer to retrieve previous repair data stored in a computer database.

27. The method of claim 22, wherein determining an appropriate repair procedure comprises providing instructions interpretable by the computer to instruct the computer to retrieve previous repair data uploaded to a computer electronic storage device from a remote computer-based network.

28. The method of claim 22 further comprising providing instructions interpretable by the computer to instruct the computer to pass said appropriate repair procedure to a comprehensive damage repair program.

* * * * *